US011879683B2

(12) United States Patent
Seelinger et al.

(10) Patent No.: US 11,879,683 B2
(45) Date of Patent: Jan. 23, 2024

(54) SELF-ALIGNING VACUUM FEED-THROUGH FOR LIQUID NITROGEN

(71) Applicant: KLA Corporation, Milpitas, CA (US)

(72) Inventors: Sherman Seelinger, San Jose, CA (US); Lauren Wilson, San Jose, CA (US)

(73) Assignee: KLA Corporation, Milpitas, CA (US)

( * ) Notice: Subject to any disclaimer, the term of this patent is extended or adjusted under 35 U.S.C. 154(b) by 28 days.

(21) Appl. No.: 17/220,719

(22) Filed: Apr. 1, 2021

(65) Prior Publication Data

US 2021/0310717 A1 Oct. 7, 2021

Related U.S. Application Data

(60) Provisional application No. 63/041,124, filed on Jun. 19, 2020, provisional application No. 63/006,690, filed on Apr. 7, 2020.

(51) Int. Cl.
*F25D 3/10* (2006.01)
*H05G 2/00* (2006.01)

(52) U.S. Cl.
CPC ............. *F25D 3/105* (2013.01); *H05G 2/008* (2013.01)

(58) Field of Classification Search
CPC ................................ F25D 3/105; H05G 2/008
See application file for complete search history.

(56) References Cited

U.S. PATENT DOCUMENTS 9,422,978 B2 8/2016 Chilese et al.
10,034,362 B2 7/2018 Kuritsyn et al.
2004/0062352 A1* 4/2004 Wake ..................... H05G 2/001 378/119
2014/0376842 A1* 12/2014 Chilese ................. F16C 33/748 384/120
2017/0142817 A1* 5/2017 Kuritsyn ................ H05G 2/008
2019/0075641 A1 3/2019 Kuritsyn et al.
2019/0215940 A1 7/2019 Khodykin et al.

FOREIGN PATENT DOCUMENTS

JP 2001015296 A * 1/2001
JP 2004037324 A 2/2004

OTHER PUBLICATIONS

Translated_Togo (Year: 2001).*
PCT/US2021/026117, International Search Report, dated Jul. 27, 2021.
PCT/US2021/026117, Written Opinion of the International Searching Authority, dated Jul. 27, 2021.

* cited by examiner

*Primary Examiner* — Elizabeth J Martin
*Assistant Examiner* — Samba Nmn Gaye
(74) *Attorney, Agent, or Firm* — Huse IP Law; Charles C. Huse

(57) ABSTRACT

A light source includes a rotatable drum, an exhaust tube coupled to the rotatable drum to exhaust nitrogen gas from an interior of the rotatable drum, a feed tube situated within the exhaust tube to provide liquid nitrogen to the interior of the rotatable drum, and a casing to surround at least a portion of the exhaust tube. The light source also includes a rotary air bearing between the exhaust tube and the casing, to allow the exhaust tube to rotate with the rotatable drum.

19 Claims, 7 Drawing Sheets

SELF-ALIGNING VACUUM FEED-THROUGH FOR LIQUID NITROGEN

RELATED APPLICATION

This application claims priority to U.S. Provisional Patent Application Nos. 63/006,690, filed on Apr. 7, 2020, and 63/041,124, filed on Jun. 19, 2020, which are incorporated by reference in their entirety for all purposes.

TECHNICAL FIELD

This disclosure relates to vacuum feed-throughs for liquid nitrogen in light sources, such as extreme ultraviolet (EUV) light sources.

BACKGROUND

An EUV light source may include a rotating drum that has an outer surface coated with solid xenon. A plasma that emits EUV light is formed by hitting the xenon on the outer surface with a laser. Liquid nitrogen is fed into the interior of the drum to keep the outer surface cold. Nitrogen gas is exhausted from the interior of the drum. Traditionally, nitrogen feed and exhaust tubes run through the middle of the shaft that rotates the drum. Such arrangements limit possible drum architectures.

SUMMARY

Accordingly, there is a need for drum architectures in which the nitrogen feed and exhaust tubes are de-coupled from actuation of the drum.

In some embodiments, a light source includes a rotatable drum, an exhaust tube coupled to the rotatable drum to exhaust nitrogen gas from an interior of the rotatable drum, a feed tube situated within the exhaust tube to provide liquid nitrogen to the interior of the rotatable drum, and a casing to surround at least a portion of the exhaust tube. The light source also includes a rotary air bearing between the exhaust tube and the casing, to allow the exhaust tube to rotate with the rotatable drum.

In some embodiments, a method of operating a light source includes rotating a drum, providing liquid nitrogen to an interior of the drum through a feed tube, and exhausting nitrogen gas from the interior of the drum through an exhaust tube coupled to the drum. The feed tube is situated within the exhaust tube. The method also includes allowing the exhaust tube to rotate with the drum, using a rotary air bearing between the exhaust tube and a casing that surrounds at least a portion of the exhaust tube.

BRIEF DESCRIPTION OF THE DRAWINGS

For a better understanding of the various described implementations, reference should be made to the Detailed Description below, in conjunction with the following drawings.

Like reference numerals refer to corresponding parts throughout the drawings and specification.

DETAILED DESCRIPTION

Reference will now be made in detail to various embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
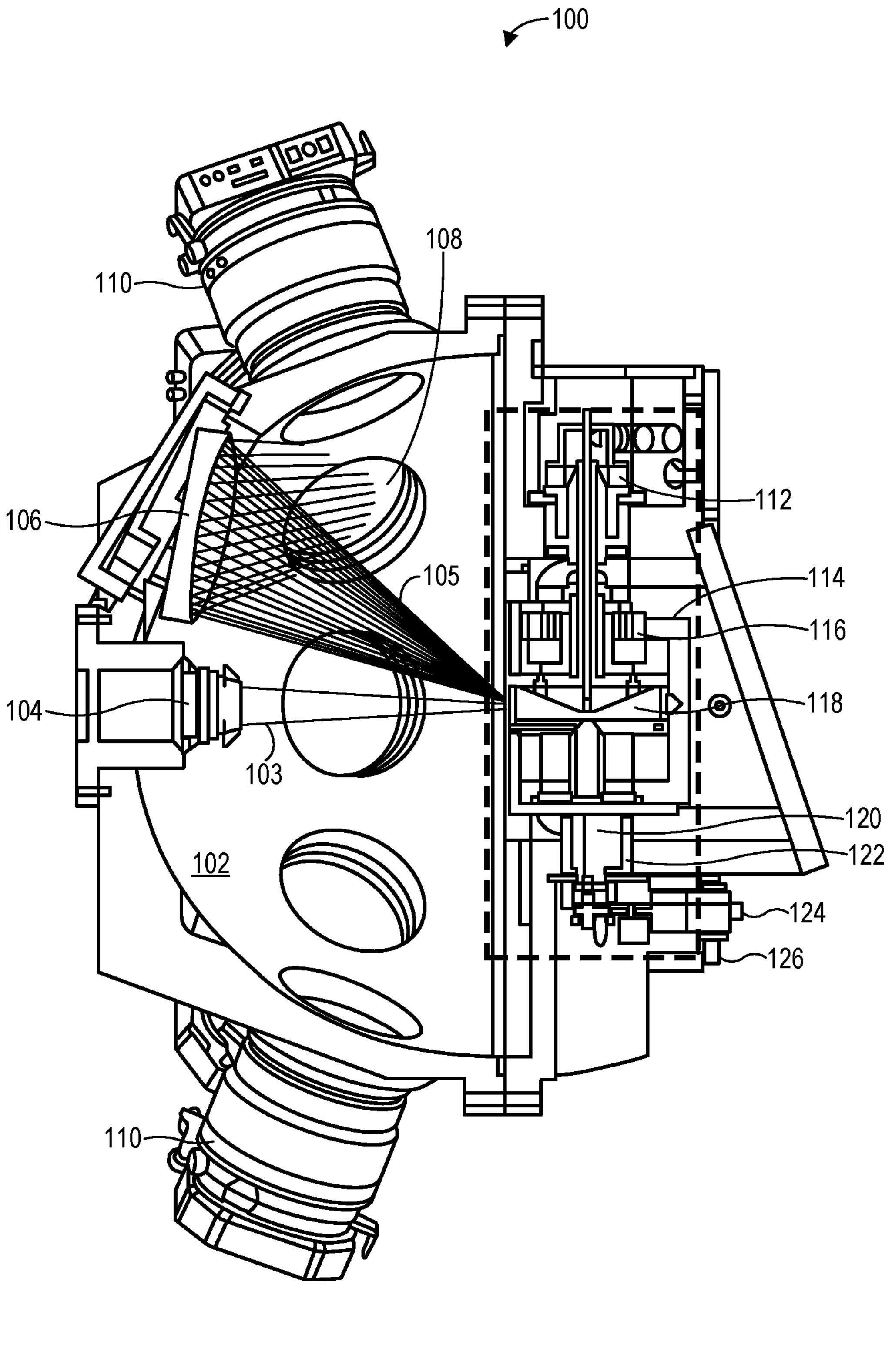
FIG. 1 is a cross-sectional side view of an EUV light source in accordance with some embodiments.

FIG. 1 is a cross-sectional side view of an extreme ultraviolet (EUV) light source 100 in accordance with some embodiments. The EUV light source 100 includes a vacuum chamber 102 (e.g., a billet aluminum chamber). Vacuum pumps 110 (e.g., turbo pumps) provide a vacuum in the vacuum chamber 102. A laser beam 103 is introduced into the vacuum chamber 102 through a laser objective 104 and accompanying pellicle. The laser objective 104 focuses the laser beam 103 on the outer surface of a drum 118, which is coated with solid xenon. When the laser beam 103 strikes the xenon on the outer surface of the drum 118, it sparks a plasma that emits EUV light 105. A mirror 106 collects a portion of the EUV light 105 and directs the collected EUV light 105 through a window 108 in the vacuum chamber 102. The drum 118 is rotated and also vertically translated to allow different regions on its outer surface to be exposed to the laser beam 103. Xenon may be sprayed onto the outer surface of the drum 118 as it rotates and translates, to maintain the xenon coating.

A feed-through assembly 112 provides liquid nitrogen to the interior of the drum 118, to keep the surface of the drum 118 cold and thus maintain the xenon coating. The liquid nitrogen boils away during operation of the EUV light source 100. The feed-through assembly 112 also exhausts the resulting nitrogen gas from the drum 118. The feed-through assembly 112 is shown in more detail in FIG. 2 (described below), in accordance with some embodiments.

The drum 118 is housed in a drum assembly 114, which is coupled to the feed-through assembly 112. The drum assembly 114 also includes a rotational motor 116 that rotates the drum 118. The rotational motor 116 is coupled to the drum 118 independently of the feed-through assembly 112. The drum assembly 114 has a water-cooled drum cover that receives water from a water-cooling input 126. Below the drum assembly 114, and thus below the drum 118, is a translational motor 120 that translates the drum 118 linearly in the vertical direction (i.e., moves the drum up and down). The translational motor 120 is also coupled to the drum 118 independently of the feed-through assembly 112. A corresponding linear-stage actuator 124 actuates the translational motor 120. Also situated below the drum assembly 114 are weight-compensating bellows 122.

Figure 2:
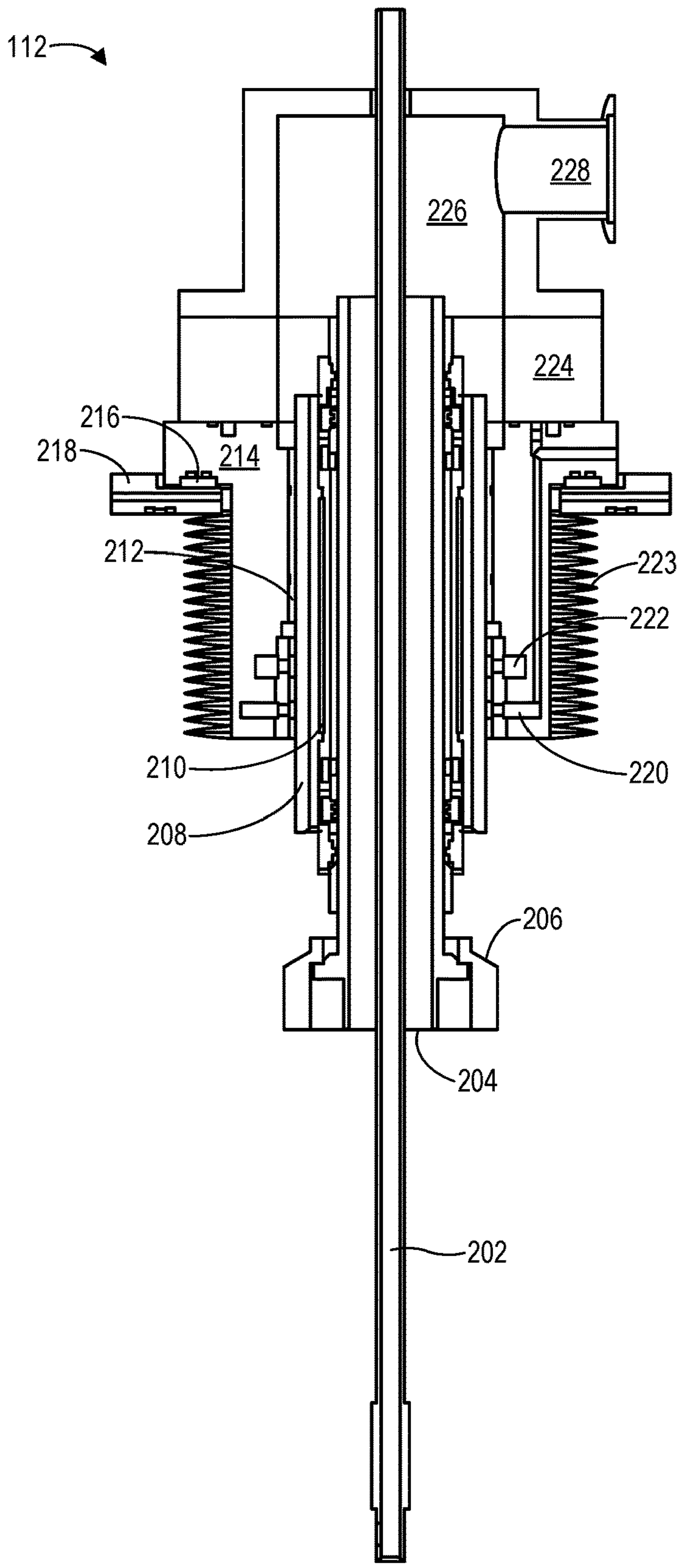
FIG. 2 is a cross-sectional side view of the feed-through assembly of the EUV light source of FIG. 1 in accordance with some embodiments.
Figure 3:
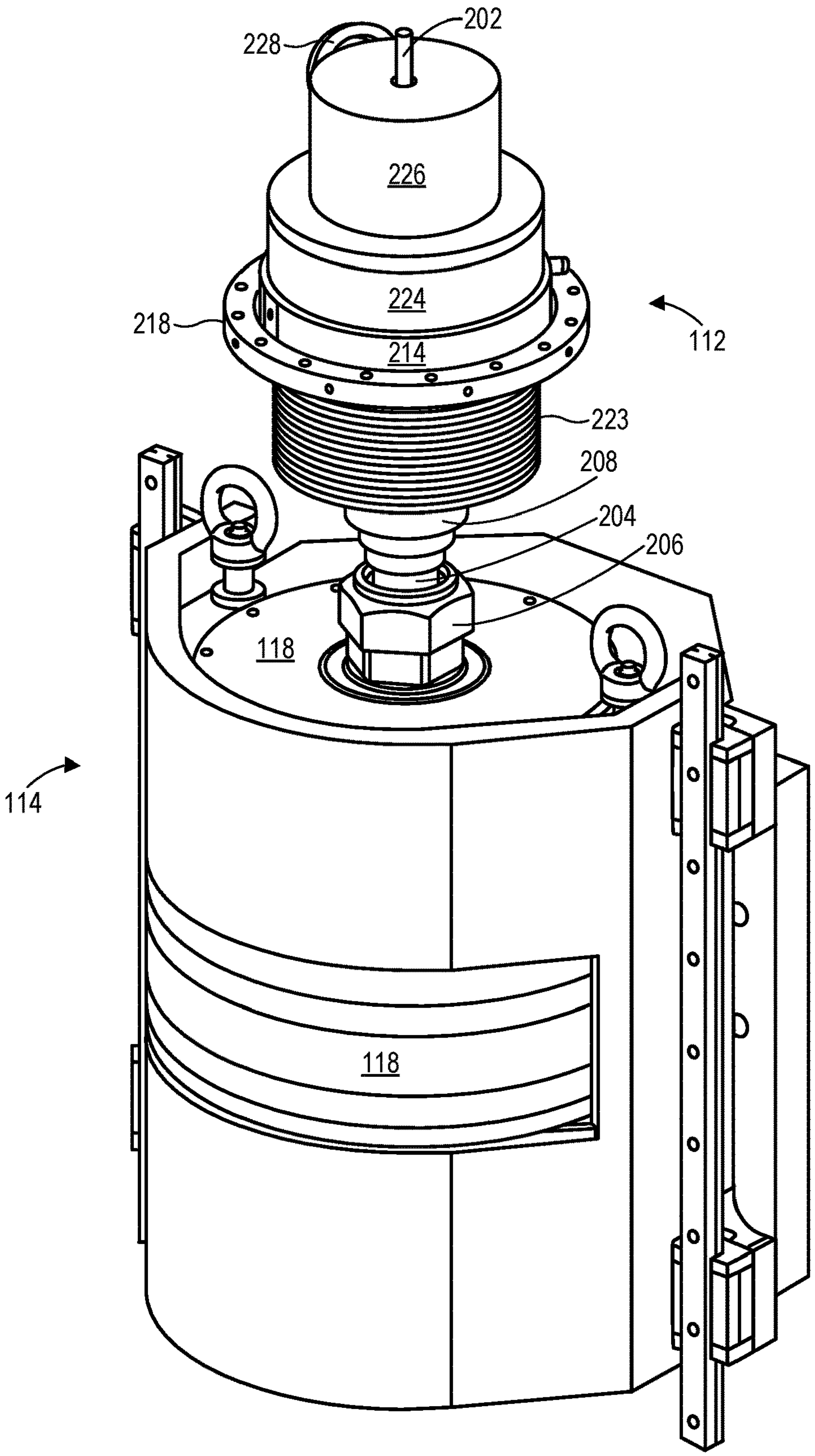
FIG. 3 is a perspective view of the feed-through assembly and drum assembly of the EUV light source of FIG. 1, in accordance with some embodiments.

FIG. 2 is a cross-sectional side view of the feed-through assembly 112 of the EUV light source 100 (FIG. 1) in accordance with some embodiments. A feed tube 202 extends into the drum 118 (FIG. 1) to provide liquid nitrogen to the interior of the drum 118. An exhaust tube 204 exhausts nitrogen gas from the interior of the drum 118. The feed tube is situated within (e.g., in the middle of) the exhaust tube 204 (e.g., such that the feed tube 202 and exhaust tube 204 are coaxial). The exhaust tube 204 is mechanically coupled to the drum 118. For example, a nut 206 couples the exhaust tube 204 to the drum 118 (e.g., as shown in FIG. 3). The nut 206 rotates with the exhaust tube 204 and the drum 118. Alternatively, another suitable coupling mechanism may be used to couple the exhaust tube 204 to the drum 118.

A casing 214 (e.g., a stainless-steel casing) surrounds at least a portion of the exhaust tube 204. A rotary air bearing 212 is situated between the casing 214 and the exhaust tube 204 to allow the exhaust tube 204 to rotate with the drum 118: the exhaust tube 204 rotates with the drum 118, while the casing 214 does not rotate. The rotary air bearing 212 includes a thin film of pressurized gas (e.g., substantially particulate-free air) in a narrow gap between the exhaust tube 204 and the casing 214. This thin film of pressurized gas acts as a substantially frictionless interface between the exhaust tube 204 and the casing 214. The rotational motor 116 (FIG. 1) that rotates the drum 118 is coupled to the drum 118 independently of the exhaust tube 204. The rotational motor 116 thus causes the drum 118 to rotate, and rotation of the drum 118 causes the exhaust tube 204 to rotate. In some embodiments, the feed tube 202 is fixed and does not rotate with the exhaust tube 204 and drum 118.

As shown in FIG. 2, the feed tube 202 and the exhaust tube 204 extend vertically above the drum 118. The rotary air bearing 212 allows the exhaust tube 204 to translate vertically with the drum 118: the exhaust tube 204 translates vertically with the drum 118, while the casing 214 does not translate vertically. The translational motor 120 (FIG. 1) that vertically translates the drum 118 is coupled to the drum 118 independently of the exhaust tube 204. The translational motor 120 thus causes the drum 118 to translate vertically, and vertical translation of the drum 118 causes the exhaust tube 204 to translate vertically. In some embodiments, the feed tube 202 is fixed and does not translate vertically with the exhaust tube 204 and drum 118.

The exhaust tube 204 has thermal insulation 210 beneath an outer layer 208. For example, the thermal insulation 210 is welded titanium. The thermal insulation 210 insulates the outer layer 208 and the rotary air bearing 212 from the cold of the interior of the exhaust tube 204, because the cold could cause the rotary air bearing 212 to malfunction. The thermal insulation 210 may allow the casing 214 to be at or near room temperature despite the cold nitrogen gas in the exhaust tube 204. In another example, a vacuum gap (e.g., vacuum gap 406, FIGS. 4B-4C) between inner and outer layers of the exhaust tube 204 provides thermal insulation.

The exhaust tube 204 extends from the drum 118 to a chamber 226 with an output 228. The exhaust tube 204 terminates in the chamber 226. The chamber 226 receives nitrogen gas from the exhaust tube 204 and vents the nitrogen gas through the output 228. A heater block 224 is situated between the chamber 226 and the casing 214, to thermally isolate the casing 214 from the chamber 226, which is cold due to the nitrogen gas. For example, the heater block 224 allows the casing 214 to be at or near room temperature.

A pump ring 222 pumps out air from the air bearing 212, to prevent the air from entering the vacuum chamber 102 (FIG. 1). An argon purge ring 220 injects argon gas, which is mostly pumped out by the pump ring 222. The argon gas from the argon purge ring 220 helps to ensure that air from the air bearing 212 does not enter the vacuum chamber 102. A small amount of the argon gas may enter the vacuum chamber, but it has minimal impact on the functionality of the EUV light source 100.

In some embodiments, a flange 218 is used to level the casing 214 and thus to level the feed-through assembly 112. A linear air bearing 216 is situated between the casing 214 and the flange 218 to accommodate horizontal translation of the casing 214 and exhaust tube 204 with respect to the flange 218. (The heater block 224 and chamber 226 also translate horizontally with the casing 214.) The linear air bearing 216 includes a thin film of pressurized gas (e.g., substantially particulate-free air) in a narrow gap between the casing 214 and the flange 218. This thin film of pressurized gas acts as a substantially frictionless interface between the casing 214 and the flange 218. The linear air bearing 216 compensates for misalignment between the feed-through assembly 112 and the drum assembly 114, and for run-out of the drum 118. Bellows 223 extend from the flange 218 to the casing 214 (e.g., to the bottom of the casing 214), to provide a vacuum seal. The bellows 223 have a first end connected to the flange 218 and a second end connected to the casing 214.

FIG. 3 is a perspective view of the feed-through assembly 112 and drum assembly 114 of the EUV light source 100 (FIG. 1), in accordance with some embodiments. The nut 206 couples the feed-through assembly 112 to the drum assembly 114. An opening on the side of the drum assembly 114 exposes the outer surface of the drum 118 to the laser beam 103 that enters the vacuum chamber 102 through the laser objective 104 (FIG. 1).

Figure 4A:
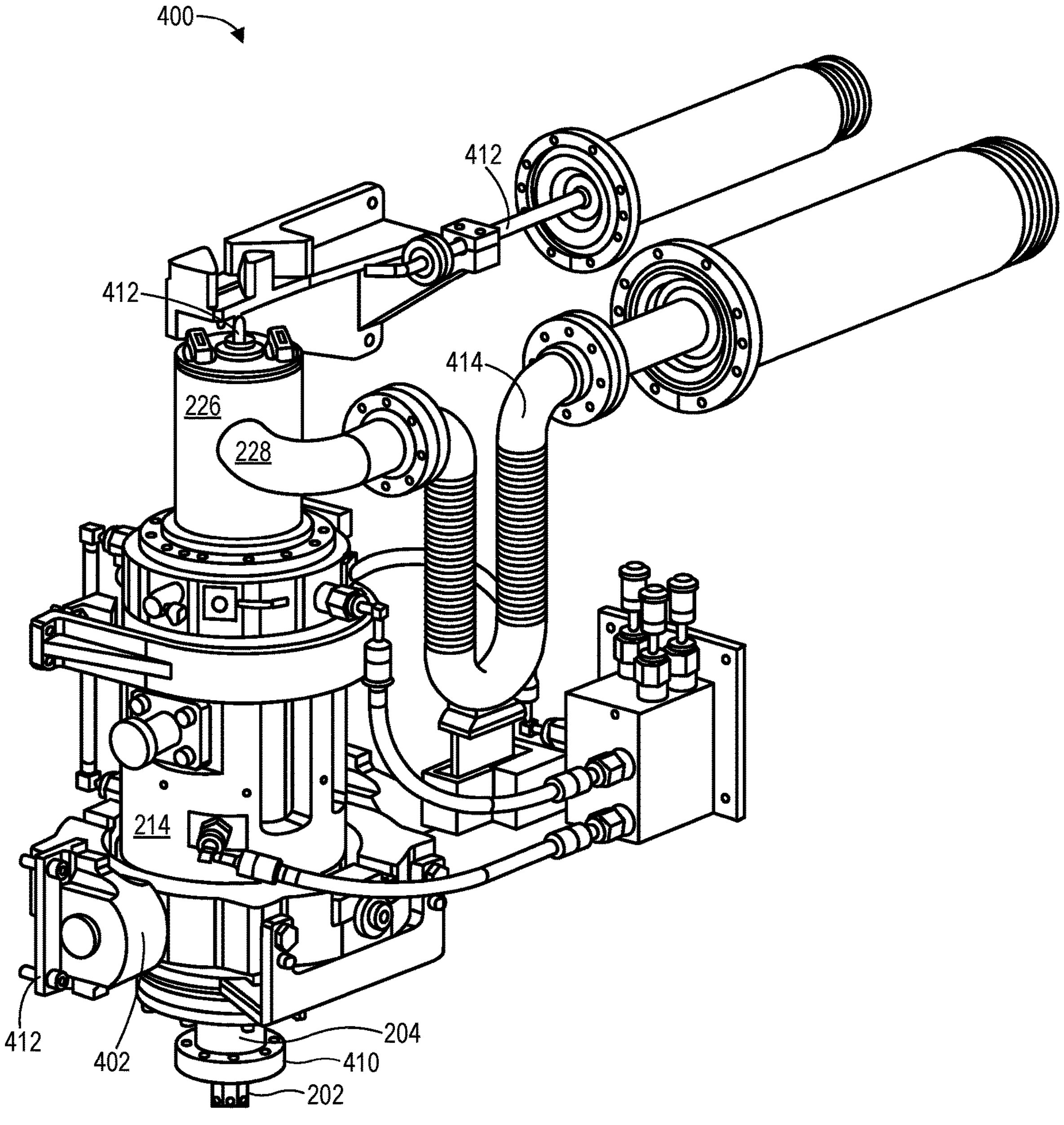
FIG. 4A is a perspective view of a feed-through assembly with a gimbal, in accordance with some embodiments.
Figure 4B:
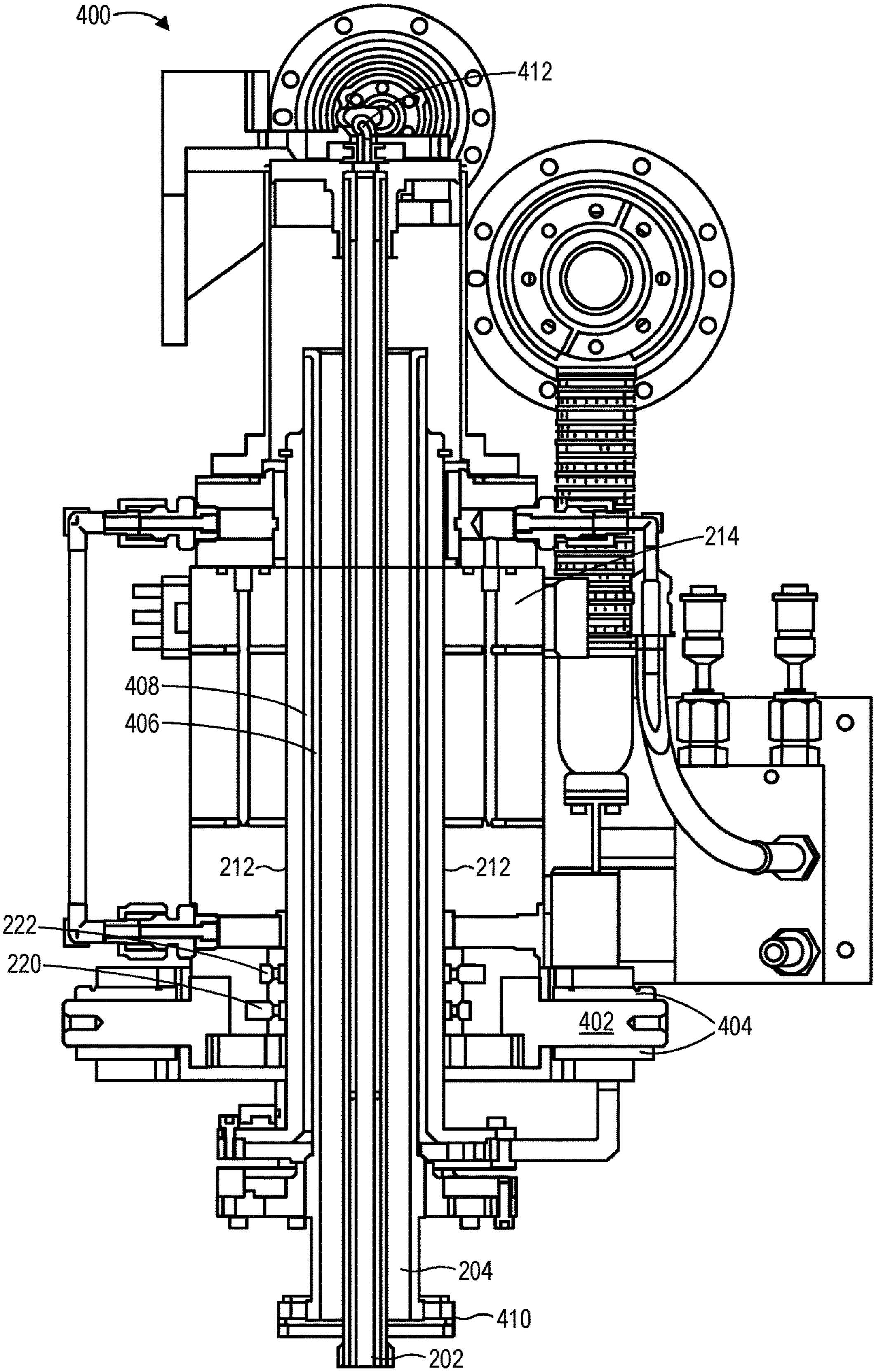
FIGS. 4B and 4C are cross-sectional sides views of the feed-through assembly of FIG. 4A, in accordance with some embodiments.
Figure 4C:
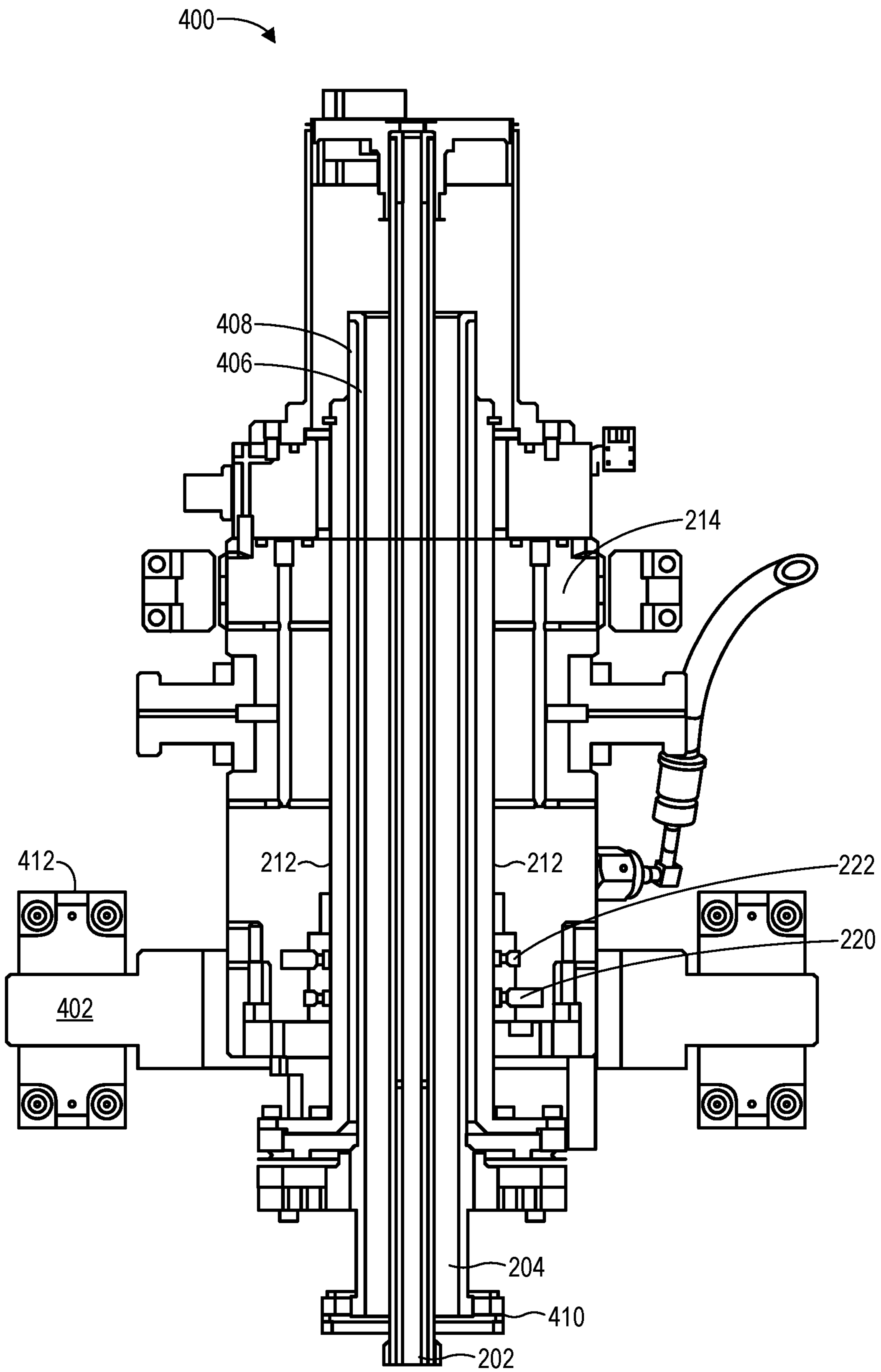

FIGS. 4A-4C show an alternative feed-through assembly 400 in which the linear air bearing 216 (FIG. 2) is replaced with a gimbal 402, in accordance with some embodiments. FIG. 4A is a perspective view of the feed-through assembly 400. FIGS. 4B and 4C are cross-sectional side views of the feed-through assembly 400; the view of FIG. 4C is rotated 90° with respect to the view of FIG. 4B. The feed-through assembly 400 is part of an EUV light source that also includes, for example, a vacuum chamber 102 with a laser objective 104, mirror 106, window 108, vacuum pumps 110, and drum assembly 114 (FIG. 1). The feed-through assembly 400 includes a rotary air bearing 212 (FIGS. 4B-4C) between the casing 214 and the exhaust tube 204. The rotary air bearing 212 functions as described for the feed-through assembly 112 (FIG. 2).

As in the feed-through assembly 112 (FIGS. 1-3), the feed tube 202 extends into the interior of the drum 118 and the exhaust tube 204 couples to the drum 118. A coupling 410 (e.g., a machined coupling) couples the feed-through assembly 400 to the drum assembly 114, and thus couples the exhaust tube 204 to the drum 118. A tube 412 (FIGS. 4A and 4B) connects to the feed tube 202 and provides liquid nitrogen to the feed tube 202, which provides the liquid nitrogen to the interior of the drum 118. A tube 414 connects to the output 228 of the chamber 226 to vent nitrogen gas from the chamber 226. Nitrogen gas is thus exhausted from the interior of the drum 118 through the exhaust tube 204, the chamber 226, the output 228, and the tube 214. The heater block 224 (FIGS. 2-3) is absent from the feed-through assembly 400, in accordance with some embodiments.

The gimbal 402, which is attached to the vacuum chamber (e.g., vacuum chamber 102, FIG. 1) with attachments 412 (FIGS. 4A and 4C), accommodates tilt and rotation of the casing 214 and exhaust tube 204. Bushings 404 (FIG. 4B) in the gimbal 402 accommodate horizontal translation of the casing 214 and exhaust tube 204 (e.g., resulting from run-out of the drum 118 and misalignment of the feed-through assembly 400 with the drum assembly 114).

The exhaust tube 204 has an outer layer 408 that is separated from the interior surface of the exhaust tube 204 by a vacuum gap 406. The vacuum gap 406 provides thermal insulation for the casing 214 with respect to the interior of the exhaust tube 204. For example, the vacuum gap 406 allows the casing 214 to be at or near room temperature despite the cold nitrogen gas in the exhaust tube 204.

The feed-through assembly 400 may be lowered into the vacuum chamber during assembly of the EUV light source and lifted out of the vacuum chamber during maintenance (e.g., to allow replacement of the drum assembly 114). The gimbal 402 allows maintenance to be performed without having to re-level the feed-through assembly 400.

Figure 5:
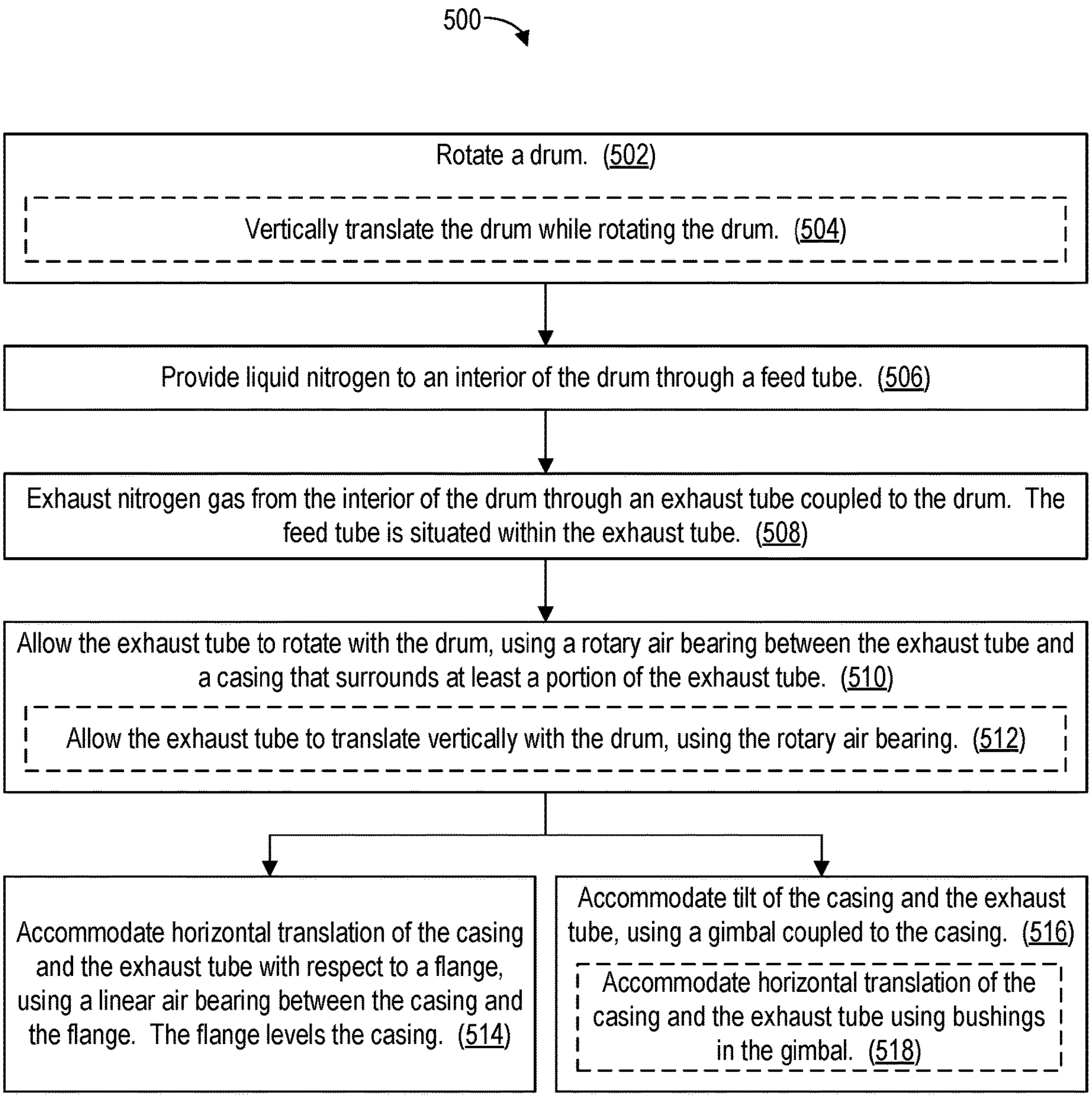
FIG. 5 is a flowchart of a method of operating a light source in accordance with some embodiments.

FIG. 5 is a flowchart of a method 500 of operating a light source (e.g., EUV light source 100, FIG. 1) in accordance with some embodiments. In the method 500, a drum 118 is rotated (502). In some embodiments, the drum 118 is vertically translated (504) while being rotated.

Liquid nitrogen is provided (506) to an interior of the drum 118 through a feed tube 202. Nitrogen gas is exhausted (508) from the interior of the drum 118 through an exhaust tube 204 coupled to the drum 118. The feed tube 202 is situated within the exhaust tube 204.

The exhaust tube 204 is allowed (510) to rotate with the drum 118, using a rotary air bearing 212 between the exhaust tube 204 and a casing 214 that surrounds at least a portion of the exhaust tube 204. In some embodiments, the rotary air bearing 212 allows (512) the exhaust tube 204 to translate vertically with the drum 118.

In some embodiments, horizontal translation of the casing 214 and the exhaust tube 204 with respect to a flange 218 is accommodated (514) using a linear air bearing 216 (FIG. 2) between the casing 214 and the flange 218. The flange 218 levels the casing 214.

In some other embodiments, tilt of the casing 214 and the exhaust tube 204 is accommodated (516) using a gimbal 402 (FIGS. 4A-4C) coupled to the casing 214. The gimbal 402 may also accommodate rotation of the casing 214 and the exhaust tube 204. Horizontal translation of the casing 214 and the exhaust tube 204 may be accommodated (518) using bushings 404 (FIG. 4B) in the gimbal 402.

While FIG. 5 shows the operations of the method 500 in a specific order, performance of the operations may overlap. For example, all of the operations are performed simultaneously. The method 500 can include more or fewer operations. Two or more operations may be combined into a single operation.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A light source, comprising:

a rotatable drum;

an exhaust tube coupled to the rotatable drum to exhaust nitrogen gas from an interior of the rotatable drum;

a feed tube situated within the exhaust tube to provide liquid nitrogen to the interior of the rotatable drum;

a casing to surround at least a portion of the exhaust tube;

a rotary air bearing between the exhaust tube and the casing, to allow the exhaust tube to rotate with the rotatable drum; and a motor, coupled to the rotatable drum independently of the exhaust tube, to rotate the rotatable drum.

2. The light source of claim 1, wherein:

the exhaust tube and the feed tube extend vertically;

the rotatable drum is vertically translatable; and the rotary air bearing allows the exhaust tube to translate vertically with the rotatable drum.

3. The light source of claim 2, wherein:

the motor is a first motor; and the light source further comprises a second motor, coupled to the rotatable drum independently of the exhaust tube, to translate the rotatable drum vertically.

4. The light source of claim 3, wherein:

the second motor is situated below the rotatable drum; and the exhaust tube and the feed tube extend above the rotatable drum.

5. The light source of claim 2, further comprising:

a flange to level the casing; and a linear air bearing between the casing and the flange.

6. The light source of claim 5, further comprising bellows having a first end connected to the flange and a second end connected to the casing.

7. The light source of claim 2, further comprising a gimbal coupled to the casing, to accommodate tilt of the casing and the exhaust tube.

8. The light source of claim 7, wherein the gimbal comprises bushings to accommodate horizontal translation of the casing and the exhaust tube.

9. The light source of claim 1, wherein the exhaust tube comprises thermal insulation.

10. The light source of claim 9, wherein the thermal insulation comprises titanium.

11. The light source of claim 9, wherein the thermal insulation comprises a vacuum gap between a first layer of the exhaust tube and a second layer of the exhaust tube.

12. The light source of claim 9, further comprising:

a chamber to receive the nitrogen gas from the exhaust tube, wherein the exhaust tube terminates in the chamber and the chamber has an output to vent the nitrogen gas; and a heater block between the chamber and the casing, to thermally isolate the casing from the chamber.

13. The light source of claim 1, further comprising a nut to couple the exhaust tube to the rotatable drum.

14. A method of operating a light source, comprising:

rotating a drum using a motor;

providing liquid nitrogen to an interior of the drum through a feed tube;

exhausting nitrogen gas from the interior of the drum through an exhaust tube coupled to the drum, wherein the feed tube is situated within the exhaust tube; and allowing the exhaust tube to rotate with the drum, using a rotary air bearing between the exhaust tube and a casing that surrounds at least a portion of the exhaust tube, wherein the motor is coupled to the drum independently of the exhaust tube.

15. The method of claim 14, wherein the exhaust tube and the feed tube extend vertically, the method further comprising:

vertically translating the drum while rotating the drum; and allowing the exhaust tube to translate vertically with the drum, using the rotary air bearing.

16. The method of claim 15, further comprising accommodating horizontal translation of the casing and the exhaust tube with respect to a flange, using a linear air bearing between the casing and the flange; wherein:

the flange levels the casing; and the horizontal translation comprises translation from run-out of the drum.

17. The method of claim 15, further comprising accommodating tilt of the casing and the exhaust tube, using a gimbal coupled to the casing.

18. The method of claim 17, wherein the gimbal comprises bushings, the method further comprising accommodating horizontal translation of the casing and the exhaust tube using the bushings, the horizontal translation comprising translation from run-out of the drum.

19. A light source, comprising:

a vertically translatable, rotatable drum;

an exhaust tube coupled to the drum to exhaust nitrogen gas from an interior of the drum, wherein the exhaust tube extends vertically;

a feed tube situated within the exhaust tube to provide liquid nitrogen to the interior of the drum, wherein the feed tube extends vertically;

a casing to surround at least a portion of the exhaust tube;

a rotary air bearing between the exhaust tube and the casing, to allow the exhaust tube to rotate with the drum and to translate vertically with the drum;

a flange to level the casing; and a linear air bearing between the casing and the flange.

* * * * *